United States Patent
Ott et al.

(10) Patent No.: US 6,560,198 B1
(45) Date of Patent: May 6, 2003

(54) METHOD AND SYSTEM FOR STABILIZED RANDOM EARLY DETECTION USING PACKET SAMPLING

(75) Inventors: Teunis J. Ott, Chester, NJ (US); Tirunell V. Lakshman, Eatontown, NJ (US)

(73) Assignees: Telcordia Technologies, Inc., Morristown, NJ (US); Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/186,241

(22) Filed: Nov. 5, 1998

Related U.S. Application Data

(60) Provisional application No. 60/064,895, filed on Nov. 7, 1997.

(51) Int. Cl.[7] .............................................. H04L 12/26
(52) U.S. Cl. ........................ 370/235; 370/230; 370/412
(58) Field of Search ................................ 370/429, 229, 370/230, 232, 235, 252, 253, 412, 428, 352, 389, 234, 392, 230.1, 231

(56) References Cited

U.S. PATENT DOCUMENTS

| | | | | |
|---|---|---|---|---|
| 5,430,709 A | * | 7/1995 | Galloway | .................. 370/241 |
| 5,938,749 A | * | 8/1999 | Rusu et al. | .................. 710/54 |
| 5,995,486 A | * | 11/1999 | Illadis | ......................... 370/229 |
| 6,034,945 A | * | 3/2000 | Hughes et al. | .............. 370/230 |
| 6,122,252 A | * | 9/2000 | Aimoto et al. | .............. 370/235 |
| 6,141,323 A | * | 10/2000 | Rusu et al. | ................. 370/236 |

* cited by examiner

Primary Examiner—Dang Ton
Assistant Examiner—Tri Phan
(74) Attorney, Agent, or Firm—Joseph Giordano; James W. Falk

(57) ABSTRACT

Methods and systems for estimating the number of active connections in a node in a communications network are described. The node estimates the number of active connections, without maintaining state information on each connection in the node, by sampling one or more packets in a buffer in the node when the node receives a packet, determining the number of sampled packets that are associated with the same connection as the received packet, and estimating the number of active connections in the node based on the determined number of the sampled packets. The node stabilizes the number of packets in the buffer by estimating the number of active connections in the node based on a sampling of the packets in the buffer when the node receives a packet, determining a probability for discarding the received packet based on the estimated number of the active connections and the recent buffer occupancy, and discarding the received packet according to the determined probability.

7 Claims, 4 Drawing Sheets

METHOD AND SYSTEM FOR STABILIZED RANDOM EARLY DETECTION USING PACKET SAMPLING

CROSS-REFERENCE TO RELATED APPLICATIONS

This application claims the benefit of U.S. Provisional Application No. 60/064,895, filed Nov. 7, 1997, the content of which is hereby incorporated in its entirety by reference. This application is also related to U.S. patent application Ser. No. 09/187,576, now Pat. No. 6,434,116 B1, Aug. 13, 2002, entitled "Method and System for Stabilized Random Early Detection using Connection Sampling," which application is filed simultaneously with this application.

BACKGROUND OF THE INVENTION

The present invention generally relates to congestion control in communication networks, and more particularly, to a method and system for buffer management in communication networks.

Communication networks transport information in the form of packets, frames, and/or cells from source nodes to destination nodes over transmission links. The Internet, for example, uses routers for routing packets to their respective destination nodes. Routers typically have buffers at their input and output ports for buffering the packets during the periods when the number of packets in the routers exceeds the bandwidth capacity at the output ports.

The Internet uses a variety of protocols for transporting packets including congestion control and error recovery. One widely used protocol is the Transmission Control Protocol (TCP), which uses a dynamic window based congestion control method. In the TCP congestion control method, the source and destination nodes are the only active participants in controlling traffic congestion in the network. A source node using the TCP congestion control method uses information about packet losses as congestion indicators. The TCP congestion control method is different from other congestion control techniques, for example DECBIT, where the network actively participates in controlling congestion by setting congestion indicator bits in packets when the network detects congestion.

A node, for example a router or a switch, which uses a TCP unaware buffer management scheme, simply discards arriving packets when its buffer is full. Unless the node buffer has a large capacity, such buffer management schemes generally reduce the network throughput. Also, the network allocates less bandwidth to connections that have long round-trip times than to connections with short round-trip times.

S. Floyd and V. Jacobson, "Random Early Detection Gateways For Congestion Avoidance," IEEE/ACM Transactions On Networking, vol. 1, no. 4, pp. 397–413, August 1993, describes a Random Early Detection (RED) technique, which uses a TCP aware buffer management scheme. With the RED technique, when the average buffer content is beyond a predetermined threshold, a node randomly discards packets according to a probability, which is based on the recent behavior of the buffer content. When a node discards a packet, the source node eventually detects this packet loss, infers that the network is congested, and decreases its transmission window (also referred to as congestion window). Hence, by decreasing the size of its congestion window and thus reducing the number of outstanding packets in the network, the source node reduces the buffer occupancy of nodes in the network.

One of the problems associated with the RED technique is that the impact of discarding a packet strongly depends on the window size of the TCP connection associated with the source node. Generally, when the source node detects a packet loss, it decreases its congestion window size by one-half and then under most circumstances, as long as the source node does not detect any more packet losses, it increases its congestion window by one Maximum Segment Size (MSS), for example one packet, once every one or two round-trip times.

For example, when a discarded packet belongs to a connection with a congestion window of, for example, 6 MSSs, the congestion window decreases by 3 MSSs to 3 MSSs, and after 3 to 6 round-trip times, the congestion window is back to its original size of 6 MSSs. On the other hand, when a discarded packet belongs to a connection with a congestion window of 1000 MSSs, the congestion window decreases by 500 MSSs to 500 MSSs, and it takes 500 to 1000 round-trip times before the congestion window is back to its original size of 1000 MSSs.

Therefore, to enhance the network throughput, a node would need to know whether a specific high buffer content is caused by a few connections with large congestion windows or by a large number of connections with small congestion windows. The former requires a small packet discard rate, whereas the latter requires a high packet discard rate.

One known solution is to maintain at each node a list of the currently active connections that are supported by the node. This solution requires per connection state information, which would be impractical when the number of connections is large or when it is desired to keep the cost of the node low while providing tolerable network performance.

Therefore, it is desirable to have a method and system for stabilizing buffer occupancy in communication networks, and thus, to overcome the disadvantages of the prior art.

DESCRIPTION OF THE INVENTION

Methods and systems consistent with the present invention estimate the number of active connections (or flows) in a node in a communications network without maintaining state information on each connection by sampling one or more packets in a buffer in the node when the node receives a packet, determining the number of the sampled packets that are associated with the same connection as the received first packet, and estimating the number of the active connections in the node based on the determined number of the sampled packets.

Furthermore, such methods and systems stabilize the buffer occupancy by estimating the number of active connections in the node based on a sampling of the packets in the buffer when the node receives the packet, determining a probability for discarding the received packet based on the estimated number of the active connections and the recent buffer occupancy, and discarding the received packet according to the determined probability. The buffer occupancy may be expressed in terms of, for example, the fraction of the buffer space that is occupied by packets.

In addition, when the buffer occupancy exceeds a first predetermined threshold and the determined number of sampled packets that are associated with the same connection as the received first packet is greater than zero, such methods and systems may collect certain state information associated with that connection, and monitor the connection based on the collected state information. When the state information collected over a predetermined interval of time is less than a second predetermined threshold, such methods and systems terminate the collection of state information associated with the connection.

Such methods and systems have several advantages over the prior art. With the present invention, the number of packets at which the buffer occupancy of a node stabilizes becomes less dependent on the number of active connections in the node. Furthermore, the present invention reduces the amount of state information that the node has to maintain for each connection. Finally, by stabilizing the buffer occupancy of the node, the amount of jitter in the network is reduced.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

A node in a communications network estimates the number of active connections in the node without maintaining state information on each connection as follows: The node samples one or more packets in a buffer in the node when the node receives a packet, and determines the number of the sampled packets that are associated with the same connection as the received packet. Based on the determined number of the sampled packets, the node then estimates the number of the active connections in the node. Furthermore, the node determines a probability for discarding the received packet based on the estimated number of the active connections and the recent buffer occupancy, and discards the received packet according to the determined probability. Accordingly through this method, the node stabilizes the buffer occupancy.

Figure 1:
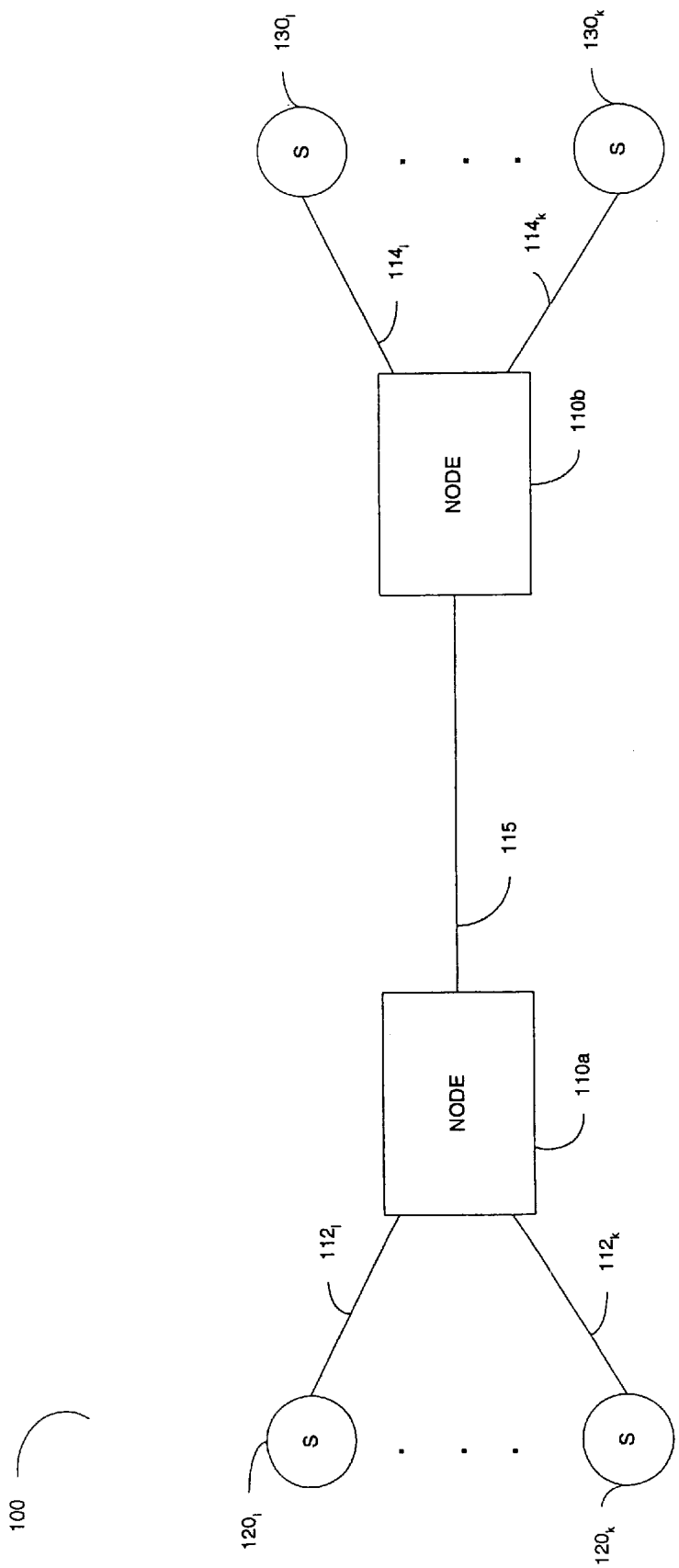
FIG. 1 is a block diagram of a communications network in accordance with an embodiment of the invention.

FIG. 1 is a block diagram of a communications network 100 in accordance with an embodiment of the invention. Communications network 100 comprises nodes 110a and 110b, transmission link 115, sources $120_1$ through $120_k$, and sources $130_1$ through $130_k$. Network 100 may be any type of packet-switched network including, for example, the Internet, a frame relay network, or an Asynchronous Transfer Mode (ATM) network. Nodes 110a and 110b each may include, for example, a router, bridge, or a switching system.

Sources $120_1$–$120_k$ interface to node 110a via links $112_1$–$112_k$, respectively. Sources $130_1$–$130_k$ interface to node 110b via links $114_1$–$114_k$, respectively. Sources $120_1$–$120_k$ and $130_1$–$130_k$ may include any equipment capable of transmitting and receiving packetized information in the form of voice, data, and/or video. Packetized information herein broadly may include packets, frames, and or cells.

Figure 2:
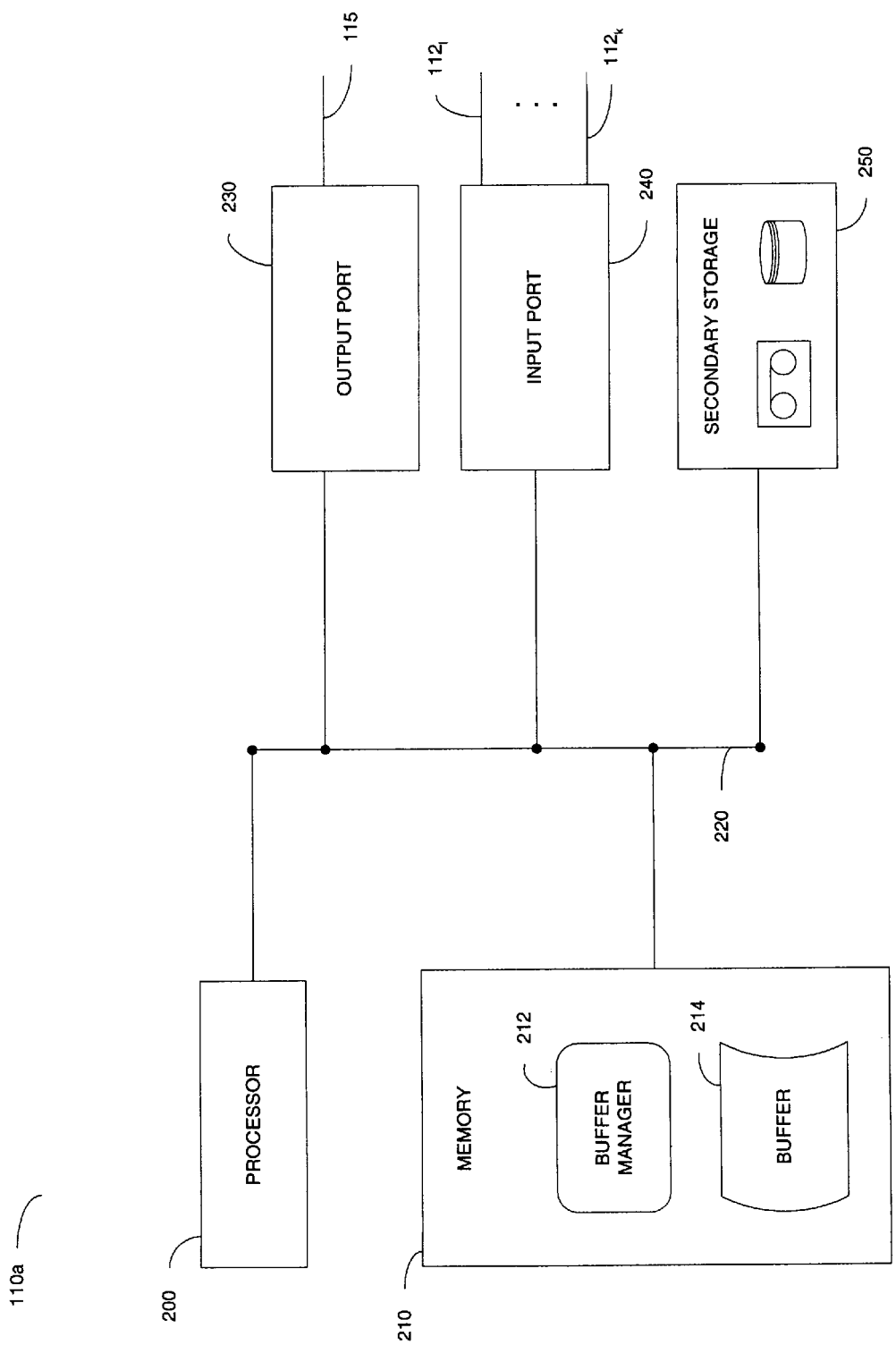
FIG. 2 is a block diagram of a node in a communications network in accordance with an embodiment of the invention.

FIG. 2 is a block diagram of node 110a in accordance with an embodiment of the invention. As shown, node 110 comprises processor 200 connected via bus 220 to memory 210, output port 230, and input port 240. Output port 230 interfaces with link 115. Input port 240 interfaces with links $112_1$–$112_k$.

Memory 210 includes buffer manager 212 and buffer 214. Buffer manager 212 includes instructions in the form of software for managing the contents of buffer 214, which processor 200 executes. Alternatively, the functionalities of buffer manager 212 and buffer 214 may be implemented in hardware or as part of output port 230 in the form of hardware or software. Buffer manager 212 processes the packets received by input port 240, and stores them in buffer 214 before they are transmitted via output port 230.

Secondary storage 250 comprises a computer readable medium such as a disk drive and a tape drive. From the tape drive, software and data may be loaded onto the disk drive, which can then be copied into memory 210. Similarly, software and data in memory 210 may be copied onto the disk drive, which can then be loaded onto the tape drive.

Figure 3:
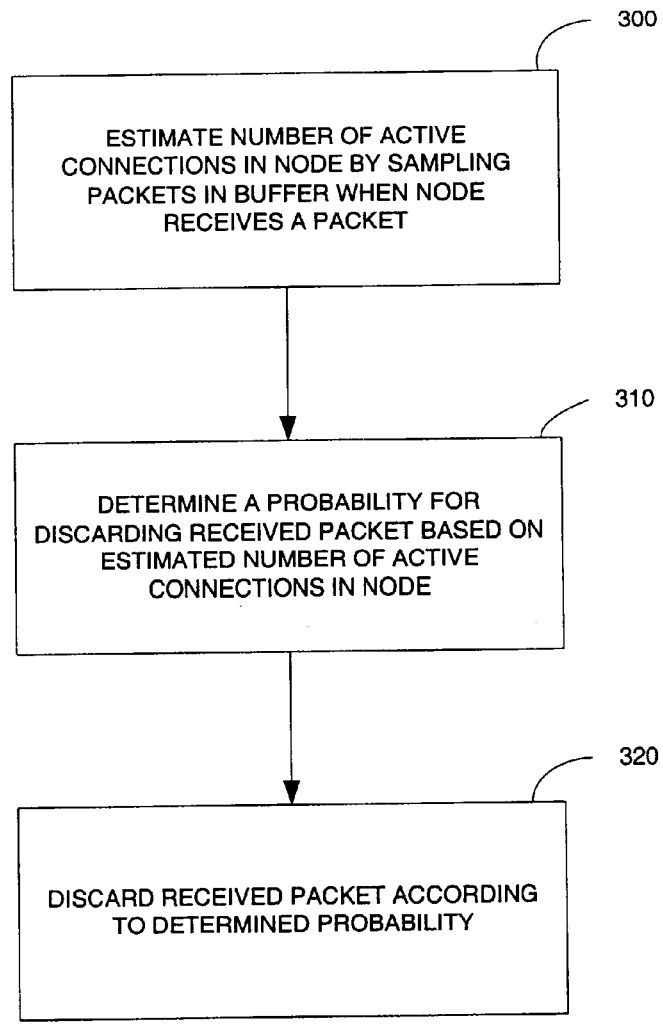
FIG. 3 is a flow chart of the steps performed by a node for stabilizing its buffer occupancy in accordance with an embodiment of the invention.

FIG. 3 is a flow chart of the steps performed by buffer manager 212 for stabilizing its buffer occupancy in accordance with an embodiment of the invention. When node 110a receives a packet via input port 240, buffer manager 212 estimates the number of active connections in node 110a by statistically sampling the packets in buffer 214 (step 300). Buffer manager 212 then determines a probability for discarding the packet based on the estimated number of active connections in node 110a (step 310). Finally, buffer manager 212 determines whether to discard the packet according to the determined discarding probability (step 330). If buffer manager 212 does not discard the packet, it stores the packet in buffer 214 before transmitting the packet via output port 230.

Figure 4:
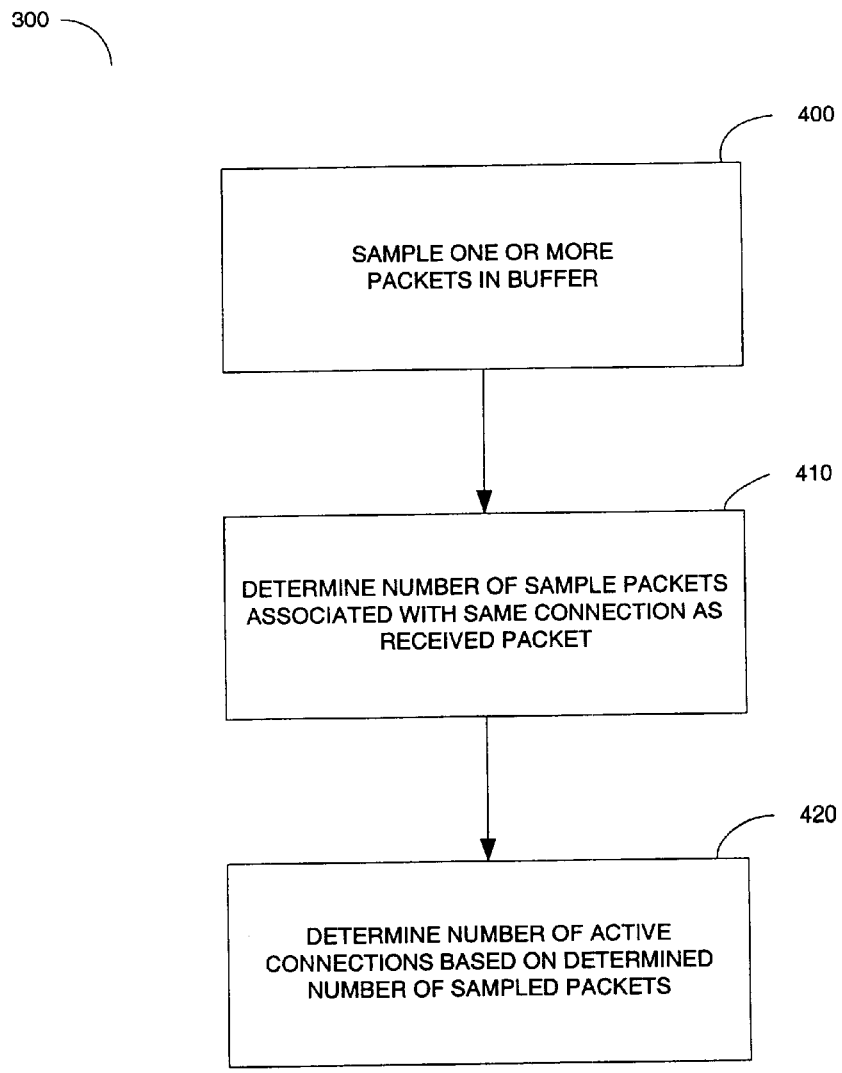
FIG. 4 is a flow chart of the steps performed by a node for estimating the number of active connections in the node in accordance with an embodiment of the invention.

FIG. 4 is a flow chart of the steps performed by buffer manager 212 for estimating the number of active connections (step 300) in accordance with an embodiment of the invention. Buffer manager 212 statistically samples, for example randomly selects, one or more packets in buffer 214 (step 400). Alternatively, buffer manager 212 may statistically sample a subset of the packets in buffer 214. In an embodiment where network 100 uses the Internet Protocol (IP) over ATM, buffer manager 212 may sample cells in buffer 214 using a method that minimizes the number of statistically sampled cells that are associated with the same frame as an arriving cell. Thus, if there are q cells in buffer 214 and q is sufficiently large, buffer manager 212 may not sample the last few hundred cells in buffer 214.

Buffer manager 212 then determines the number of randomly selected packets that are associated with the same connection as the received packet (step 410). This determined number herein is referred to as the number of hits. Buffer manager 212 may determine that two packets are associated with the same connection when they each have the same origination address, origination port number, destination address, destination port number, and protocol identifier. Alternatively, buffer manager 212 may determine that two packets are associated with the same connection when they each have the same destination address, regardless of their respective origination addresses. The specific method for determining the sameness of the connections may, in part, be determined by the level of aggregation in the connections. For example, in an IP network the same connection may include one or more flows. Alternatively, in an ATM network the same connection may include one or more virtual circuits or a virtual path.

Based on the number of randomly selected packets that are associated with the connection of the received packet, buffer manager 212 estimates the number of active connections in node 110a (step 420). Buffer manager 212 may determine a flow factor, D(t), as follows:

$$D(t) = (1-\alpha) \times D(t-1) + \alpha \frac{J(t)}{K(t)},$$

where $0<\alpha<1$, K(t) is the number of packets in buffer 214 against which buffer manager 214 samples packet t, J(t) is the number of sampled packets in buffer 214 that are associated with the same connection as the received packet t, D(t−1) is the flow factor when packet (t−1) arrived at node 110a, and D(0) is initialized to, for example, 0. α is the smoothing constant of an exponential smoothing scheme, and has a value of, for example, 1/B, where B is the capacity of buffer 214 expressed in terms of average packet size. For example, in an embodiment where buffer 214 has a capacity of 1 MBytes and the average packet size is 300 Bytes/packet, 1/B may be selected to be 0.0003 (300 Bytes/1 MBytes).

Furthermore, buffer manager 212 uses 1/D(t) as an estimate of the effective number of active connections in node 110a when packet t arrives at node 110a. Buffer manager 212 determines, for example, a discarding probability $P_{discard}$ for packet t as follows:

$$P_{discard} = C_1 \min\left(C_3^2, \frac{1}{(C_3 D(t))^2}\right)\left(1 + C_2 \frac{J(t)}{K(t)}\right),$$

where $C_1$ is a function of buffer 214 occupancy q, $C_2$ and $C_3$ are constants, K(t) is the number of packets in buffer 214 against which buffer manager 214 samples packet t, and J(t), is the number of sampled packets in buffer 214 that are associated with the same connection as packet t.

Table 1 illustrates discrete values of $C_1$ as a function of buffer 214 occupancy q in accordance with an embodiment of the invention. Alternatively, $C_1$, may change gradually as a function of buffer 214 occupancy q. In the embodiment of Table 1, buffer 214 capacity B is 400 Kbytes, and constants $C_2$ and $C_3$ are equal to 256 and 16, respectively.

TABLE 1

| q (KBytes) | $C_1(q)$ |
|---|---|
| q < 200 | 0 |
| 200 ≤ q < 225 | $2^{-18}$ |
| 225 ≤ q < 250 | $2^{-17}$ |
| 250 ≤ q < 275 | $2^{-16}$ |
| 275 ≤ q < 300 | $2^{-15}$ |
| 300 ≤ q < 325 | $2^{-14}$ |
| 325 ≤ q < 350 | $2^{-13}$ |
| 350 ≤ q < 375 | $2^{-12}$ |
| 375 ≤ q < 400 | $2^{-11}$ |
| q = 400 | ∞ |

There may be two restrictions on the discard probabilities determined by buffer manager 212 in accordance with the embodiment of Table 1. First, when buffer 214 is almost full, for example when buffer 214 is 93.75% to 99.99% occupied, D(t) is zero or almost zero, and for an arriving packet t, J(t) equals zero, buffer manager 212 may determine discard probabilities preferably in the range of 0.09 to 0.15. Alternatively, buffer manager 212 may determine discard probabilities in any other range, as long as that range is suitable for achieving a desired buffer 214 occupancy q in a particular embodiment of the invention.

Second, when the discard probabilities change discretely at certain buffer 214 occupancy q boundaries (as shown in Table 1), buffer manager 212 may preferably limit the changes in the discard probabilities to less than, for example, a factor of 4. In the embodiment of Table 1, except for the extreme boundaries (q<200 and q=400), the discard probabilities at buffer 214 occupancy q boundaries change by a factor of 2.

In accordance with an embodiment of the invention, when the buffer 214 occupancy q exceeds a first predetermined threshold and buffer manager 212 determines a hit for a packet associated with a connection in buffer 214, buffer manager 212 may monitor and collect certain state information associated with that connection. The state information may include, for example, the interval of time or a subset of the interval of the time the connection is monitored, the number of packets that are associated with the connection and that arrive during the interval, and/or the arrival rate of packets associated with the connection.

Buffer manager 212 monitors the connection until it determines that the state information collected over a predetermined interval of time, for example the arrival rate of packets associated with the connection, is less than a second predetermined threshold. Accordingly, buffer manager 212 would monitor and maintain in memory 210 only, for example, the arrival rate of packets associated with the connection and only as long as the arrival rate collected over the predetermined interval of time is greater than or equal to the second predetermined threshold. As an illustration, below are three examples for identifying such connections. When buffer manager 212 determines that the state information collected over the predetermined interval of time is less than the second predetermined threshold, buffer manager 212 terminates the monitoring and collection of state information associated with that connection.

In one embodiment, for a high buffer 214 occupancy q, buffer manager 212 may set a time-out period of a few buffer drain times when buffer manager 212 determines a hit associated with a connection. Specifically, when buffer manager 212 determines that at time τ a connection has a hit, buffer manager 212 sets a penalty flag associated with the connection for the duration of the time-out period. When node 110a receives a packet associated with the connection while the penalty flag associated with that connection is set, buffer manager 212 determines whether to admit or discard the received packet based on a set of rules, examples of which are described below in detail. When the time-out period expires, buffer manager 212 removes the penalty flag associated with the connection.

In another embodiment, buffer manager 212 maintains two packet arrival thresholds $I_{low}$ and $I_{high}$ for each connection in node 110a. Buffer manager 212 may determine $I_{low}$ and $I_{high}$ based on buffer 214 occupancy q and D(t). For example, buffer manager 212 may compute $I_{low}$ and $I_{high}$ based on some multiple of the product of output port 230 bandwidth that node 110a allocates to active connections and D(t).

Buffer manager 212 records the time τ when it sets the penalty flag associated with the connection and the number of packets associated with the connection that arrive while the penalty flag is set. Buffer manager 212 also determines the average arrival rate of packets associated with the connection by, for example, dividing the number of arriving packets associated with the connection by the amount of time elapsed since time τ. When the average arrival rate of packets falls below $I_{low}$, buffer manager 212 resets the penalty flag associated with the connection. While the average arrival rate exceeds $I_{high}$ and the penalty flag is set, buffer manager 212 discards all arriving packets that are associated with the connection.

In yet another embodiment, buffer manager 212 maintains two time-out periods, $TO_1$ and $TO_2$, each of which may depend on the buffer occupancy and D(t). $TO_1$, may be a fraction of one buffer drain time, for example, ⅓, and $TO_2$ may be equal to or greater than $TO_1$. When buffer manager 212 determines a hit for an arriving packet associated with a connection that does not have a penalty flag set, buffer manager 212 admits the arriving packet into buffer 214 and then sets a penalty flag associated with the connection for a period of length $TO_1$.

When buffer manager 212 determines a hit for an arriving packet associated with a connection while the penalty flag is set, buffer manager 212 discards the packet, and extends the time-out period by $TO_2$. Accordingly, the connections that space their packets by more than, for example, ⅔ of buffer drain time remain on the average unaffected. Buffer manager 212 may set the duration of a time-out period to be, for example, proportional to the throughput that a connection is allowed to achieve. Since buffer manager 212 does not discard the initial packet that sets the penalty flag associated with a connection, buffer manager 212 reduces the likelihood of discarding two successive packets associated with connections that sufficiently space their packets.

In yet another embodiment, when buffer manager 212 determines a hit for an arriving packet, buffer manager 212 discards the packet, and sets the penalty flag associated with the connection for a period of time $TO_1$. However, buffer manager 212 does not discard the next arriving packet associated with that connection while the penalty flag is set. Instead, buffer manager 212 extends the penalty period by $TO_2$. From there on, while the penalty flag is set, buffer manager 212 discards all arriving packets associated with the connection and extends the time-out period to $TO_2$.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for stabilizing occupancy of a buffer in a node in a communications network, wherein said node comprises connections and the buffer includes packets associated with the connections, the method comprising the steps of:
   estimating the number of active connections in the node by sampling the packets in the buffer when the node receives a first packet, said estimating step comprising the steps of
   statistically sampling one or more of the packets in the buffer,
   determining the number of sampled packets that are associated with the same connection as the received first packet, and
   estimating the number of active connections based on the determined number of sampled packets;
   identifying a connection in the node when the buffer occupancy exceeds a predetermined threshold and the determined number of sampled packets is greater than zero;
   collecting state information associated with the identified connection, said state information including at least one of the interval of time or a subset of the interval of time the connection is monitored, the number of packets that are associated with the connection and arrive during the interval, and the arrival rate of packets associated with the connection;
   determining a probability for discarding the received first packet based on the estimated number of active connections; and
   discarding the received first packet according to the determined probability.

2. A method for stabilizing occupancy of a buffer in a node in a communications network, wherein said node comprises connections and the buffer includes packets associated with the connections, said method comprising the steps of:
   estimating the number of active connections in the node by sampling the packets in the buffer when the node receives a first packet, said estimating step including sampling one more of the packets in the buffer;
   determining the number of sampled packets that are associated with the same connection as the received first packet; and
   estimating the number of active connections based on the determined number of sampled packets;
   determining a probability for discarding the received first packet based on the estimated number of active connections;
   discarding the received first packet according to the determined probability;
   receiving at the node a second packet associated with the same connection as the received first packet;
   discarding the second packet when the node receives the second packet within a predetermined time and the determined number of sampled packets is greater than zero;
   admitting the second packet into the buffer when the determined number of sampled packets is zero; and
   incrementing the first predetermined time by a second predetermined time when the node receives the second packet within the first predetermined time and the determined number of sampled packets is greater than zero.

3. A method for stabilizing occupancy of a buffer in a node in a communications network, wherein said node comprises connections and the buffer includes packets associated with the connections, said method comprising the steps of:
   estimating the number of active connections in the node by sampling the packets in the buffer when the node receives a first packet, said estimating step including sampling one or more of the packets in the buffer;
   determining the number of sampled packets that are associated with the same connection as the received first packet; and estimating the number of active connections based on the determined number of sampled packets;

determining a probability for discarding the received first packet based on the estimated number of active connections;

discarding the received first packet according to the determined probability;

receiving at the node within a predetermined time a second packet associated with the same connection as the received first packet;

determining an average arrival rate of packets associated with the same connection as the received first packet;

discarding the received second packet when the determined average arrival rate is greater than a first predetermined threshold and the determined number of sampled packets is greater than zero; and admitting the received second packet into the buffer when the determined average arrival rate is less than a second predetermined threshold.

4. The method of claim 1 further comprising the step of:

terminating collection of state information when the collected state information over a predetermined interval of time is less than a second predetermined threshold.

5. The method of claim 4 further comprising the steps of:

setting a time-out period at a time when a connection has a hit;

setting a penalty flag associated with the connection;

determining whether to admit or discard a new packet associated with the connection while the penalty flag is set; and removing the penalty flag when the time-out period expires.

6. The method of claim 5 wherein said step of determining whether to admit or discard a new packet comprises the step of determining the average arrival rate of packets associated with the connection.

7. The method of claim 5 further comprising discarding the packet that sets the penalty flag and wherein said step of determining whether to admit or discard a new packet comprises the steps of admitting the next packet associated with the connection, resetting the time out period, and discarding all arriving packets associated with the connection during the extended time out period.

* * * * *

UNITED STATES PATENT AND TRADEMARK OFFICE
CERTIFICATE OF CORRECTION

PATENT NO. : 6,560,198 B1
APPLICATION NO. : 09/186241
DATED : May 6, 2003
INVENTOR(S) : Ott et al.

Page 1 of 1

It is certified that error appears in the above-identified patent and that said Letters Patent is hereby corrected as shown below:

In the Specification

Column 4, Lines 3-4, delete "$120_1$-$120_k$ and $130_1$-$130_k$may" and insert -- $120_1$-$120_k$ and $130_1$-$130_k$ may --, therefor.

Column 4, Line 40, delete "(step 330)." and insert -- (step 320). --, therefor.

Column 5, Line 48, delete "$C_1$, may" and insert -- $C_1$ may --, therefor.

Column 7, Line 13, delete "$TO_1$, may" and insert -- $TO_1$ may --, therefor.

In the Claims

Column 8, Line 31, in Claim 2, delete "including" and insert -- including: --, therefor.

Column 8, Line 32, in Claim 2, delete "one more" and insert -- one or more --, therefor.

Column 8, Line 34, in Claim 2, delete "as the" and insert -- is the --, therefor.

Column 8, Line 63, in Claim 3, delete "including" and insert -- including: --, therefor.

Signed and Sealed this
Twenty-fourth Day of February, 2015

Michelle K. Lee
*Deputy Director of the United States Patent and Trademark Office*